Nov. 17, 1931.  M. TOROK  1,832,753
CLOCK
Filed Oct. 6, 1930  2 Sheets-Sheet 1

Martin Torok.
INVENTOR

BY Victor J. Evans
ATTORNEY

WITNESS: George L. Ogle.

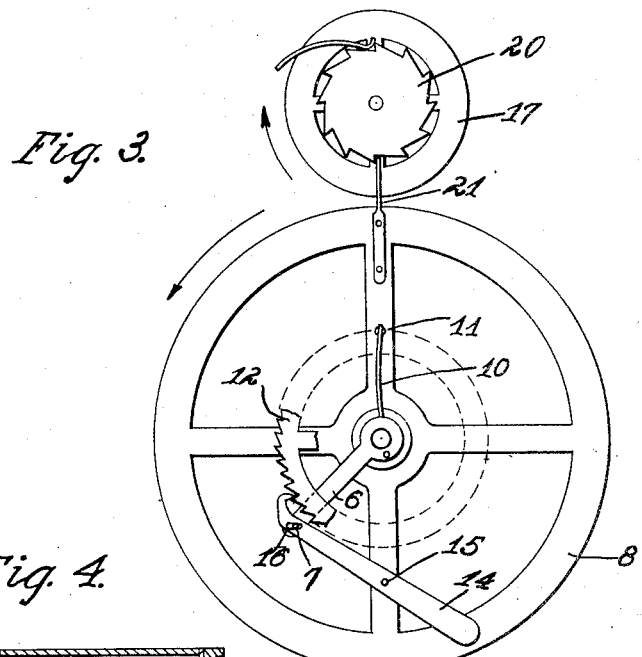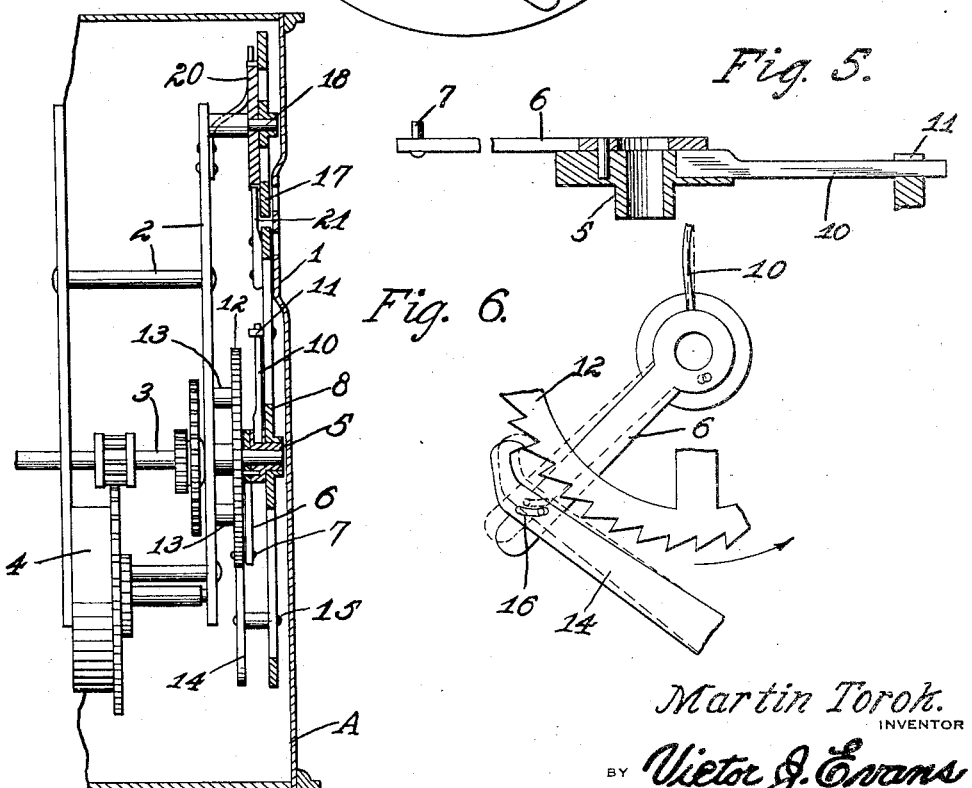

Patented Nov. 17, 1931

1,832,753

UNITED STATES PATENT OFFICE

MARTIN TOROK, OF BRAWLEY, CALIFORNIA

CLOCK

Application filed October 6, 1930. Serial No. 486,810.

This invention relates to a clock, the general object of the invention being to provide a pair of numbered wheels with means for so moving the wheels that the numbers of one wheel will indicate the hours and the numbers on the other wheel will indicate the minutes, thus eliminating the use of the hour and minute hands and facilitating the telling of the time.

This invention also consists in certain other features of construction and in the combination and arrangement of the several parts, to be hereinafter fully described, illustrated in the accompanying drawings, and specifically pointed out in the appended claim.

In describing my invention in detail, reference will be had to the accompanying drawings, wherein like characters denote like or corresponding parts throughout the several views, and in which:

Figure 3 is a rear view of the number carrying wheels and showing portions of the operating means therefor.

Figure 4 is a vertical sectional view through the clock.

Figure 5 is a view partly in section showing the hub and the arm and spring carried thereby.

Figure 6 is a detail view showing how the dog connects with the teeth of the minute wheel and is moved by the arm on the drive shaft of the clock.

Figure 1:
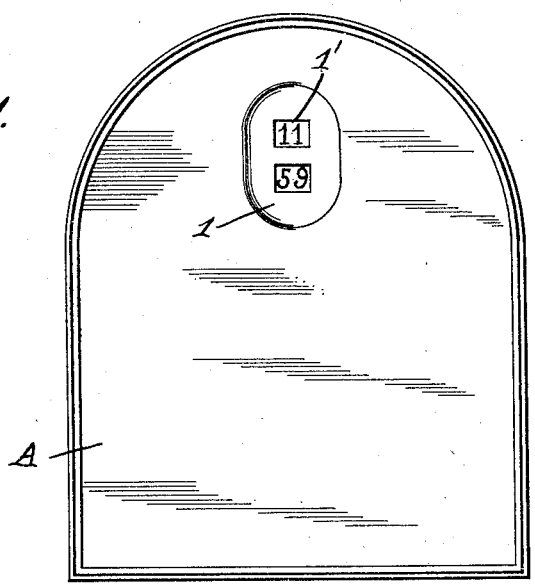
Figure 1 is a front view of the clock.
Figure 2:
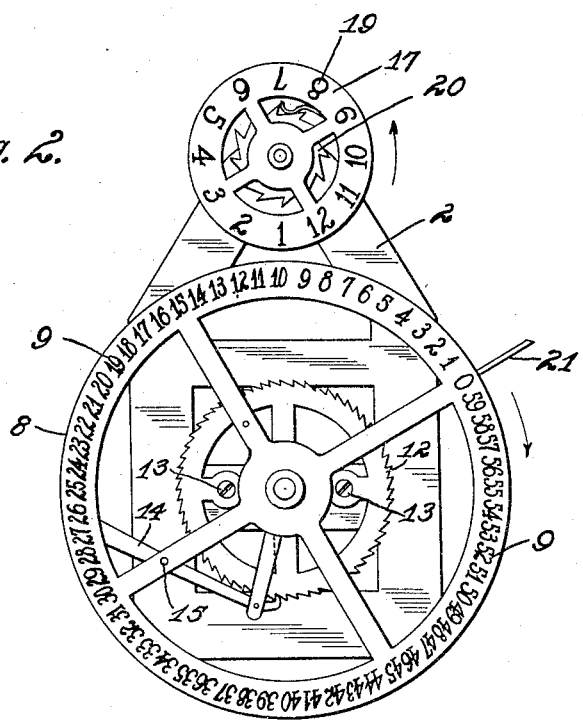
Figure 2 is a front view of the mechanism thereof.

In these drawings the letter A indicates the casing of the clock, the front of which is provided with the window 1 and the numeral 2 indicates the frame in the clock which carries the interior mechanism. A shaft 3 forms part of this mechanism and is driven in the usual manner from the spring motor 4. The front end of the shaft has a hub 5 attached thereto and an arm 6 is attached to the hub and has a pin 7 at its outer end. A minute wheel 8 is rotatably arranged on the outer end of the shaft and carries on its rim the numerals 9 indicating the minutes of an hour. These numerals will appear through the window 1 during the rotation of the wheel. A spring 10 has one end connected with the hub and its other end is connected with one of the spokes of the wheel 8 as shown at 11 so that the wheel is moved from the shaft by said spring. A ratchet wheel 12 is fastened to the frame 2 as shown at 13 and a dog 14 is pivoted to one of the spokes of the wheel as shown at 15 and engages the teeth of the ratchet wheel 12. This dog has a curved slot 16 therein which receives the pin 7 of the arm 6.

An hour wheel 17 is rotatably arranged on a shaft 18 carried by the top part of the frame and has the numerals 19 thereon for indicating the hours, these numerals also appearing through the window 1. A ratchet wheel 20 is connected with the wheel 17 and the teeth of this ratchet are engaged by a spring dog 21 on the wheel 8 so that the hour wheel is moved one step at each revolution of the wheel 8.

From the foregoing it will be seen that the engagement of the dog 14 with the stationary ratchet wheel 12 tends to prevent movement of the arm 6, and the shaft 3 by the spring motor, but the pressure of the spring motor would cause the pin 7 of the arm 6 working in the slot 16 to move the dog outwardly until it clears the tooth of the wheel 12 and then the shaft and arm will jump forwardly the distance of a tooth of the wheel 12 and thus the spring 10 will move the wheel 8 one step to bring another numeral in front of the window 1, and this movement will cause the pin 7 to move back to the outer end of the slot 16 and thus cause the dog to engage the next tooth. Thus the wheel 8 is moved step by step and the teeth on the wheel 12 are so arranged that the parts will operate to bring a numeral on the wheel 8 in front of the window 1 each sixty seconds. When the wheel 8 has made a complete revolution, the dog 21 will engage the ratchet wheel of the hour wheel 17 and thus move the same one step to bring another numeral in front of the window 1' to indicate another hour.

What I claim is:

A clock of the class described comprising a minute wheel having numerals thereon indicating minutes, a motor driven shaft on which the wheel is loosely mounted, an arm fastened to the shaft and having a pin in its outer end, a dog pivoted to the minute wheel and having a curved slot therein for receiving the pin on the arm, a stationary ratchet wheel the teeth of which are engaged by the dog, and a leaf spring for connecting the arm with the minute wheel.

In testimony whereof I affix my signature.

MARTIN TOROK.